United States Patent
Lin et al.

(10) Patent No.: US 10,764,104 B2
(45) Date of Patent: Sep. 1, 2020

(54) REFERENCE SIGNAL DESIGN WITH ZADOFF-CHU SEQUENCES

(71) Applicant: TELEFONAKTIEBOLAGET LM ERICSSON (PUBL), Stockholm (SE)

(72) Inventors: Xingqin Lin, Santa Clara, CA (US); Ansuman Adhikary, Hyderabad (IN); Ali S. Khayrallah, Mountain View, CA (US); Havish Koorapaty, Saratoga, CA (US); Yi-Pin Eric Wang, Fremont, CA (US)

(73) Assignee: TELEFONAKTIEBOLAGET LM ERICSSON (PUBL) (SE)

( * ) Notice: Subject to any disclaimer, the term of this patent is extended or adjusted under 35 U.S.C. 154(b) by 0 days.

(21) Appl. No.: 16/348,856

(22) PCT Filed: Nov. 10, 2017

(86) PCT No.: PCT/IB2017/057045
§ 371 (c)(1),
(2) Date: May 9, 2019

(87) PCT Pub. No.: WO2018/087706
PCT Pub. Date: May 17, 2018

(65) Prior Publication Data
US 2019/0260628 A1   Aug. 22, 2019

Related U.S. Application Data

(60) Provisional application No. 62/421,165, filed on Nov. 11, 2016.

(51) Int. Cl.
*H04W 74/08* (2009.01)
*H04L 27/26* (2006.01)
(Continued)

(52) U.S. Cl.
CPC ...... *H04L 27/2675* (2013.01); *H04J 13/0062* (2013.01); *H04L 5/0094* (2013.01);
(Continued)

(58) Field of Classification Search
CPC ............ H04L 27/2675; H04L 27/2657; H04L 5/0094; H04L 27/2607; H04L 27/2613;
(Continued)

(56) References Cited

U.S. PATENT DOCUMENTS 8,379,591 B2 * 2/2013 Iwai ................. H04J 13/22
370/330
8,457,257 B2 * 6/2013 Cheng ............. H04L 27/2647
375/343
(Continued)

OTHER PUBLICATIONS

Alvarez et al., "Time and Frequency Self-Synchronization in Dense Cooperative Network", Nov. 2, 2014. pp. 1811-1815, 48th Asilomar Conference on Signals, Systems and Computers, IEEE.
(Continued)

Primary Examiner — Jay P Patel

(57) ABSTRACT

Provided are methods (400) of estimating a time delay and/or a frequency shift of a reference signal. Such methods include receiving (405) a first reference signal that is generated using a first Zadoff-Chu (ZC) sequence, receiving (410) a second reference signal that is generated using a second ZC sequence that is different than the first ZC sequence, and processing (415) the first reference signal and the second reference signal to estimate at least one of the time delay and the frequency shift of the first reference signal and/or the second reference signal.

20 Claims, 13 Drawing Sheets

(51) Int. Cl.
*H04J 13/00* (2011.01)
*H04L 5/00* (2006.01)

(52) U.S. Cl.
CPC ...... *H04L 27/2607* (2013.01); *H04L 27/2613* (2013.01); *H04L 27/2657* (2013.01); *H04L 27/2663* (2013.01); *H04L 27/2666* (2013.01); *H04L 27/2671* (2013.01); *H04W 74/0833* (2013.01)

(58) Field of Classification Search
CPC ............. H04L 27/2663; H04L 27/2666; H04L 27/2671; H04J 13/0062; H04W 74/0833
See application file for complete search history.

(56) References Cited

U.S. PATENT DOCUMENTS

| | | | | |
|---|---|---|---|---|
| 10,333,739 B2* | 6/2019 | Seo | .................. | H04J 11/0076 |
| 2010/0118919 A1* | 5/2010 | Nakao | .................. | H04J 13/0003 |
| | | | | 375/140 |
| 2010/0195700 A1* | 8/2010 | Ogawa | .................. | H04L 25/0258 |
| | | | | 375/132 |
| 2010/0285755 A1* | 11/2010 | Iwai | .................. | H04J 13/0062 |
| | | | | 455/68 |
| 2010/0311428 A1 | 12/2010 | Zhang et al. | | |
| 2011/0176406 A1* | 7/2011 | Mauritz | .................. | H04J 13/0062 |
| | | | | 370/208 |
| 2012/0213190 A1* | 8/2012 | Yoon | .................. | H04L 5/0035 |
| | | | | 370/329 |
| 2014/0313997 A1* | 10/2014 | Xu | .................. | H04J 13/16 |
| | | | | 370/329 |
| 2014/0355710 A1* | 12/2014 | Takata | .................. | H04B 7/0452 |
| | | | | 375/267 |
| 2016/0329998 A1* | 11/2016 | Li | .................. | H04L 5/005 |
| 2018/0248680 A1* | 8/2018 | Ji | .................. | H04J 11/0069 |

OTHER PUBLICATIONS

Qualcomm Incorporated, "NB-PSS and NB-SSS Design(Revised)", 3GPP Draft; R1-161981, NB-PSS and NB-SSS Design, 3rd Generation Partnership Project (3GPP), Mar. 22, 2016.

3GPP TS 26.211 V13.2.0, "3rd Generation Partnership Project; Technical Specification Group Radio Access Network; Evolved Universal Terrestrial Radio Access (E-UTRA); Physical channels and modulation (Release 13)", section 5.7.1. Jun. 2016.

3GPP TS 26.211 V13.2.0, "3rd Generation Partnership Project; Technical Specification Group Radio Access Network; Evolved Universal Terrestrial Radio Access (E-UTRA); Physical channels and modulation (Release 13)", section 6.11.1. Jun. 2016.

* cited by examiner

REFERENCE SIGNAL DESIGN WITH ZADOFF-CHU SEQUENCES

RELATED APPLICATIONS

This application is national phase of PCT Patent Application No. PCT/IB2017/057045, filed Nov. 10, 2017, which claims the benefit of U.S. Provisional Patent Application No. 62/421,165, filed Nov. 11, 2016, the disclosures of which are hereby incorporated herein by reference in their entirety.

TECHNICAL FIELD

The disclosed subject matter relates generally to design of reference signals in a radio access network and, more particularly, in a radio network with connectivity from the sky.

BACKGROUND

There has been a surge of interest in adapting LTE radio access networks to cater for different deployment scenarios. A new innovative trend is to provide "connectivity from the sky." To provide such connectivity, platforms being considered include drones, balloons, aircrafts, airships, and/or satellites, among others. LTE standards have been designed primarily for a terrestrial network and have not been optimized to provide "connectivity from the sky." In particular, compared to traditional terrestrial LTE infrastructure that may generally be stationary, these new platforms in the sky are usually non-stationary and may move at high speeds.

In an LTE radio access network, a wireless device or user equipment (UE) typically follows the following access procedures.
1) Cell search: Search and acquire synchronization to a cell in the network.
2) System information reading: Receive and decode system information necessary for proper operation in the network.
3) Random access: Once the system information has been correctly decoded, UE can perform random access to access the network.

In an existing LTE random access design, random access may serve multiple purposes such as initial access when establishing a radio link, transmitting scheduling requests, etc. Among others, one objective of random access may be to achieve uplink synchronization, which may be important for maintaining uplink orthogonality in an LTE network. To preserve orthogonality among different UEs in an OFDMA or SC-FDMA system, the time of arrival (ToA) of each UE's signal may need to be within the cyclic prefix (CP) of the OFDMA or SC-FDMA signal at the base station.

LTE random access can be either contention-based or contention-free. A contention-based random access procedure may generally include four operations. Brief reference is made to FIG. 8, which is a signal flow diagram illustrating a contention-based random-access procedure. Note that the first operation involves physical-layer processing specifically designed for random access, while the random-access response 810, the scheduled transmission 815 and the contention resolution 820 may follow the same physical-layer processing used in uplink and downlink data transmission. For contention-free random access, the UE uses reserved preambles assigned by the base station. In this case, contention resolution is not needed, and thus only operations 805 and 810 may be required.

Still referring to FIG. 8, in terrestrial LTE networks, the eNB estimates a ToA from a received Msg1 transmitted by UE in operation 805. Based on the estimate, eNB feeds back the acquired uplink timing in Msg2 to command the UE to perform timing advance in operation 810. This timing advance mechanism may help ensure that the subsequent uplink signals from UEs located in different positions in the cell can arrive at the base station within the CP range.

According to LTE standards, random access preambles may be sent in physical random-access channel (PRACH). The PRACH subcarrier spacing may be 1.25 kHz and the preambles may be Zadoff-Chu (ZC) sequences of length 839. A fixed number of preambles may be available in each LTE cell. For example, 64 preambles may be available in each LTE cell. Several preamble formats of different durations of the sequence and cyclic prefix (CP) may be defined to be used for cells of different sizes. The format configured in a cell may be broadcast in the System Information.

ZC sequences have also been used as reference signals for other purposes in LTE networks as well. For example, ZC sequences may be used in the 3 primary synchronization signals (PSS) in LTE networks. There may be 3 length-63 ZC sequences for the PSS and the length-63 ZC sequences may be extended with 5 zeros at the edges and mapped to the center 73 subcarriers in LTE. Together with secondary synchronization signals (SSS), PSS may enable the UE to acquire frequency and symbol synchronization to a cell, frame timing of the cell, and physical-layer cell identity of the cell.

ZC sequences may also be candidates for reference signals in 5G new radio (NR), such as downlink synchronization signals and uplink random access preambles.

It is known that the ambiguity function of ZC sequences does not have the "thumbtack-like" property, which features a single central peak in the Delay-Doppler plane. In particular, there are several peaks in the ambiguity function of ZC sequences in the Delay-Doppler plane, leading to many timing and Doppler ambiguities when ZC sequences are used to acquire timing and frequency synchronization.

Using LTE PRACH as a specific example, LTE PRACH subcarrier spacing is 1.25 kHz and may not handle a Doppler shift (plus residual carrier frequency offsets) larger than 1.25 kHz. Due to the nature of ZC sequences, both delay and frequency shift cause cyclic shift in the observation window of received ZC sequences at the eNB. As a result, two issues may arise. First, it may be difficult if not impossible to separate the two effects (delay and frequency shifts) by observing the composite cyclic shift. Separating the delay and frequency shift may be advantageous, however, to provide estimates thereof. Second, the composite cyclic shift may make sequence A be interpreted as sequence B, leading to misdetection. Although LTE PRACH cyclic shift set has been designed to avoid this situation, the capacity to avoid misdetection may be limited to frequency shifts that are less than 1.25 kHz, which is not sufficient for LTE deployments in high Doppler scenarios. Such scenarios may include a moving base station in the air, such as a satellite or other airborne device.

Approaches described in the Background section could be pursued, but are not necessarily approaches that have been previously conceived or pursued. Therefore, unless otherwise indicated herein, the approaches described in the Background section are not prior art to the inventive embodiments disclosed in this application and are not admitted to be prior art by inclusion in the Background section. Therefore, any description contained in the Background section may be moved to the Detailed Description section.

SUMMARY

Example methods, nodes, and systems are operable to resolve time delay and Doppler frequency shift ambiguities when ZC sequences are used to construct reference signals. The reference signals may be any one of different types of radio system reference signals, including, e.g., a downlink synchronization signal or an uplink random access preamble.

Some embodiments are directed to methods of estimating a time delay and/or a frequency shift of a reference signal. Such methods may include receiving a first reference signal that is generated using a first Zadoff-Chu (ZC) sequence, receiving a second reference signal that is generated using a second ZC sequence that is different than the first ZC sequence, and processing the first reference signal and the second reference signal to estimate at least one of the time delay and the frequency shift of the first reference signal and/or the second reference signal.

In some embodiments, processing the received first and second reference signals includes correlating the received first reference signal with a local copy of the first reference signal to generate a first set of correlation results, correlating the received second reference signal with a local copy of the second reference signal to generate a second set of correlation results, detecting a first correlation peak in the first set of correlation results, detecting a second correlation peak in the second set of correlation results, and estimating at least one of the time delay and the frequency shift of at least one of the reference signals using the detected first and second correlation peaks.

Some embodiments provide that processing the received first and second reference signals includes detecting the signals using a set of hypotheses of at least one of the time delay and frequency shift, determining a best hypothesis of the set of hypotheses, and estimating at least one of the time delay and frequency shift according to the best hypothesis.

In some embodiments, the received first and second reference signals are time domain multiplexed. Some embodiments provide that the received first and second reference signals are frequency domain multiplexed. In some embodiments, the received first and second reference signals are time and frequency domain multiplexed.

In some embodiments, the first ZC sequence is generated using a first root and the second ZC sequence is generated using a second root that is different than the first root and the first ZC sequence has a same length as the second ZC sequence.

Some embodiments provide that the second ZC sequence includes a cyclic shift relative to the first ZC sequence. In some embodiments, the second ZC sequence is generated as a conjugate of the first ZC sequence. Some embodiments provide that the first ZC sequence and the second ZC sequence include a same root, a same length and a same cyclic shift.

Some embodiments provide that the first ZC sequence includes a first length and the second ZC sequence includes a second length that is different than the first length.

In some embodiments, the first and second reference signals are downlink synchronization signals in a radio access network. Some embodiments provide that the radio access network is one of an LTE and a 5G network.

In some embodiments, the first and second reference signals are uplink random access preambles in a radio access network. Some embodiments provide that the radio access network is one of an LTE and a 5G network.

Some embodiments are directed to a radio node that is adapted to carry out operations corresponding to any of the methods described herein.

In some embodiments, the radio node is a wireless device. Some embodiments provide that the radio node is a non-stationary radio access node. In some embodiments, the non-stationary radio access node is a satellite. In some embodiments, the non-stationary radio access node is airborne.

Some embodiments disclosed herein are directed to a computer program product comprising a non-transitory computer readable medium storing program code that when executed by a processor of a UE causes the UE to perform operations corresponding to any of the methods described herein.

Some embodiments are directed to a radio communication network that includes a first radio node that includes a transceiver to provide wireless communication over a radio interface, at least one processor coupled to the transceiver, and at least one memory coupled to the at least one processor and storing program code that when executed by the at least one processor causes the at least one processor to perform operations comprising receiving, via the transceiver, a first reference signal that is generated using a first Zadoff-Chu (ZC) sequence, receiving, via the transceiver, a second reference signal that is generated using a second ZC sequence that is different than the first ZC sequence, and processing the first reference signal and the second reference signal to estimate at least one of the time delay and the frequency shift of the first reference signal and/or the second reference signal. The network may include a second radio node that is configured to generate the first and second signals and to transmit the first and second reference signals to the first radio node.

In some embodiments, at least one of the first radio node and the second radio node includes one of a wireless device and a non-stationary radio access node. Some embodiments provide that the non-stationary radio access node includes one of a satellite and an airborne device.

Some embodiments are directed to a wireless communication device (UE) that includes a transceiver to provide wireless communication over a radio interface, at least one processor coupled to the transceiver, and at least one memory coupled to the at least one processor and storing program code that when executed by the at least one processor causes the at least one processor to perform operations including receiving a first reference signal that is generated using a first Zadoff-Chu (ZC) sequence, receiving a second reference signal that is generated using a second ZC sequence that is different than the first ZC sequence, and processing the first reference signal and the second reference signal to estimate at least one of the time delay and the frequency shift of the first reference signal and/or the second reference signal.

In some embodiments, processing the received first and second reference signals includes correlating the received first reference signal with a local copy of the first reference signal to generate a first set of correlation results, correlating the received second reference signal with a local copy of the second reference signal to generate a second set of correlation results, detecting a first correlation peak in the first set of correlation results, detecting a second correlation peak in the second set of correlation results, and estimating at least one of the time delay and the frequency shift of at least one of the reference signals using the detected first and second correlation peaks.

In some embodiments, processing the received first and second reference signals includes generating correlation peaks corresponding to a set of hypothetical values of time delay and/or frequency shift, detecting the first and second reference signals using the set of hypothetical values, determining a best hypothesis of the set of hypothetical values, and estimating at least one of the time delay and frequency shift according to the best hypothesis.

Some embodiments provide that the first ZC sequence is generated using a first root and the second ZC sequence is generated using a second root that is different than the first root and that the first ZC sequence has a same length as the second ZC sequence.

In some embodiments, the second ZC sequence includes a cyclic shift relative to the first ZC sequence. Some embodiments provide that the second ZC sequence is generated as a conjugate of the first ZC sequence. In some embodiments, the first ZC sequence and the second ZC sequence include a same root, a same length and a same cyclic shift. In some embodiments, the first ZC sequence includes a first length and the second ZC sequence includes a second length that is different than the first length. Some embodiments provide that the first and second reference signals are downlink synchronization signals in a radio access network. In some embodiments, the first and second reference signals are uplink random access preambles in a radio access network.

Some embodiments are directed to a computer program product that includes a computer readable storage medium having computer readable code embodied in the computer readable storage medium that when executed by a processor of a wireless communication device causes the wireless communication device to perform operations including receiving a first reference signal that is generated using a first Zadoff-Chu (ZC) sequence, receiving a second reference signal that is generated using a second ZC sequence that is different than the first ZC sequence, and processing the first reference signal and the second reference signal to estimate at least one of the time delay and the frequency shift of the first reference signal and/or the second reference signal.

Some embodiments are directed to methods of estimating a time delay and/or a frequency shift of a reference signal. Operations according to such methods include generating a first reference signal using a first Zadoff-Chu (ZC) sequence, generating a second reference signal using a second ZC sequence that is different than the first ZC sequence, and transmitting the first reference signal and the second reference signal to a radio node that is configured to process the first reference signal and the second reference signal to estimate at least one of the time delay and the frequency shift of the first reference signal and/or the second reference signal.

In some embodiments, methods include multiplexing the first and second reference signals before transmitting the first and second reference signals. Some embodiments provide that the first and second reference signals are time domain multiplexed and/or frequency domain multiplexed.

In some embodiments, the first ZC sequence is generated using a first root and the second ZC sequence is generated using a second root that is different than the first root, and the first ZC sequence has a same length as the second ZC sequence.

In some embodiments, the second ZC sequence includes a cyclic shift relative to the first ZC sequence. Some embodiments provide that the second ZC sequence is generated as a conjugate of the first ZC sequence. In some embodiments, the first ZC sequence and the second ZC sequence include a same root, a same length and a same cyclic shift. In some embodiments, the first ZC sequence includes a first length and the second ZC sequence includes a second length that is different than the first length. Some embodiments provide that the first and second reference signals are downlink synchronization signals in a radio access network. Some embodiments provide that the radio access network is one of an LTE and a 5G network.

In some embodiments, the first and second reference signals are uplink random access preambles in a radio access network. Some embodiments provide that the radio access network is one of an LTE and a 5G network.

Some embodiments are directed to a network node that includes a reference signal generation module that is configured to generate first and second reference signals using first and second ZC sequences and a reference signal transmission module that is configured to transmit the first and second reference signals to a radio node that is configured to estimate the time delay and/or frequency shift using the first and second reference signals.

Some embodiments are directed to a network node that includes a reference signal receiver module that is configured to receive a first reference signal that is generated using a first Zadoff-Chu (ZC) sequence and a second reference signal that is generated using a second ZC sequence and a reference signal processing module that is configured to process the first reference signal and the second reference signal to estimate at least one of the time delay and the frequency shift of the first reference signal and/or the second reference signal.

BRIEF DESCRIPTION OF THE DRAWINGS

The drawings illustrate selected embodiments of the disclosed subject matter. In the drawings, like reference labels denote like features.

DETAILED DESCRIPTION

Figure 1:
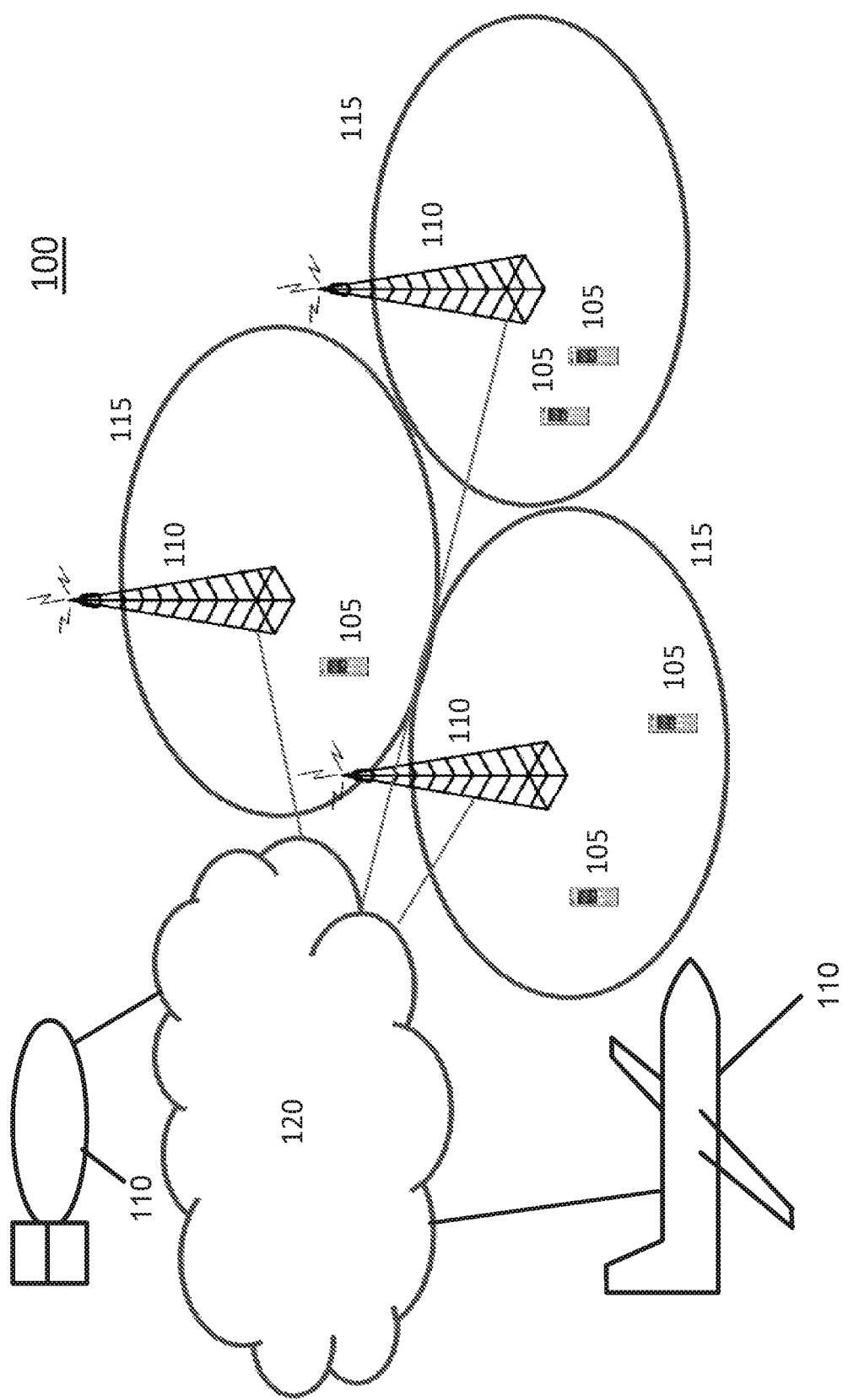
FIG. 1 is a diagram illustrating an LTE network according to some embodiments.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other. Moreover, certain details of the described embodiments may be modified, omitted, or expanded upon without departing from the scope of the described subject matter.

As used herein, a "radio node" is either a radio access node or a wireless device.

As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

As used herein, a "core network node" is any type of node in a Core Network (CN). Some examples of a core network node include, e.g., a Mobility Management Entity (MME), a Packet Data Network (PDN) Gateway (P-GW), a Service Capability Exposure Function (SCEF), or the like.

As used herein, a "wireless device" is any type of device that is capable of wirelessly transmitting and/or receiving signals to/from another wireless device or to/from a network node in a cellular communications network to obtain has access to (i.e., be served by) the cellular communications network. Some examples of a wireless device include, but are not limited to, a User Equipment device (UE) in a 3GPP network, a Machine Type Communication (MTC) device, an NB-IoT device, an FeMTC device, etc.

As used herein, a "network node" is any node that is used and can correspond to any type of radio network node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, etc.

As used herein, the non-limiting term user equipment (UE) is used and it refers to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, ProSe UE, V2V UE, V2X UE, etc.

As used herein, the non-limiting term WAN (wireless access network or RAN, radio access network) node can be a UE or a network node (e.g. access point, BS etc.) The WAN node may be interchangeably called as cellular node, NW source node etc.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system. Moreover, in the description herein, reference may be made to the term "cell;" however, particularly with respect to Fifth Generation (5G) concepts, beams may be used instead of cells and, as such, it is important to note that the concepts described herein are equally applicable to both cells and beams.

Reference is made to an LTE PRACH as a non-limiting example of a reference signal in this description. Other reference signals in a radio access network may instead be used including, for example, 5G NR synchronization reference signals.

Figure 9:
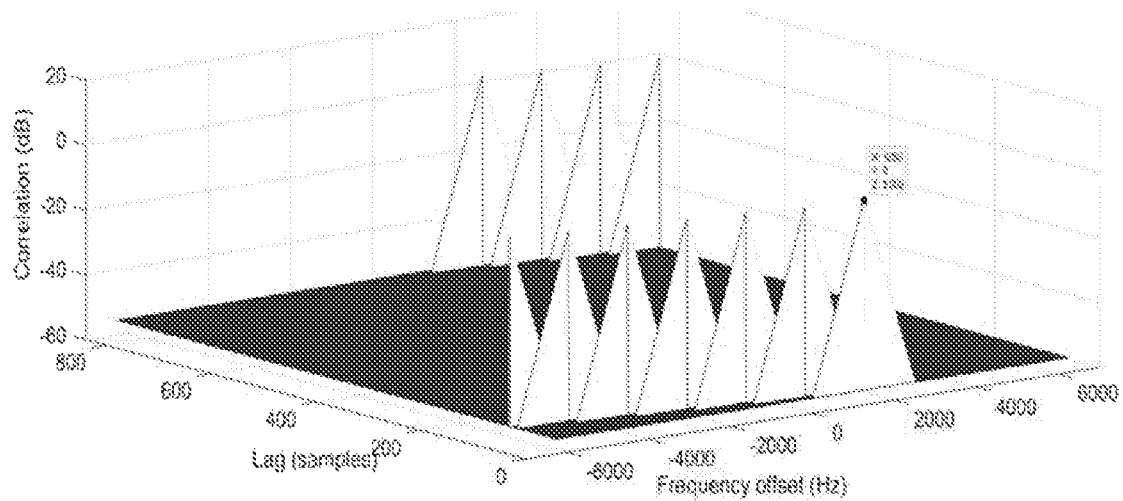
FIG. 9 is a first graph of correlation results of a conventional correlation operation performed by a radio node on a received reference signal and a local copy of the reference signal.

A receiver in a radio access network may need to estimate delay and frequency offset of a reference signal. For example, an eNB may need to estimate the delay and frequency offset of an LTE PRACH signal. The eNB will typically do so by correlating the received reference signal with its reference copy of the reference signal. This operation may also be referred to herein as correlation of a transmit and receive signal. If a delay of zero and a frequency offset of 1.25 kHz is assumed, the correlation may be performed at multiple hypothetical values of frequency offsets that are incremented by 1.25 kHz. Brief reference is made to FIGS. 9 and 10, which are first and second graphs of correlation results of conventional correlation operations performed by a radio node on a received reference signal and a local copy of the reference signal using ZC sequences having different respective roots. For example, the correlation results of operations plotted in FIGS. 9 and 10 correspond to ZC sequences with roots 56 and 714, respectively. As shown in both FIGS. 9 and 10, the correlation results include multiple correlation peaks of the same height. Accordingly, it may be difficult or impossible to separate the effects of delay and frequency offset in an LTE PRACH in the presence of both large timing and frequency uncertainties. Accordingly, it may be difficult to estimate ToA at the eNB and which may result in misdetection of random access preambles.

The described embodiments may be implemented in any appropriate type of communication system supporting any suitable communication standards and using any suitable components. As one example, certain embodiments may be implemented in an LTE network, such as that illustrated in FIG. 1.

Reference is now made to FIG. 1, which is a diagram illustrating an LTE network according to some embodiments. A communication network 100 comprises multiple wireless devices 105 and multiple radio access nodes 110. Communication network 100 is organized into cells 115, which are connected to a core network 120 via corresponding radio access nodes 110. Radio access nodes 110 are capable of communicating with wireless communication devices 105 along with any additional elements suitable to support communication between wireless communication devices or between a wireless communication device and another communication device (such as a landline telephone). In certain embodiments radio access nodes 110 are not stationary and are implemented, e.g., in drones, balloons, aircrafts, airships, or satellites.

Figure 2:
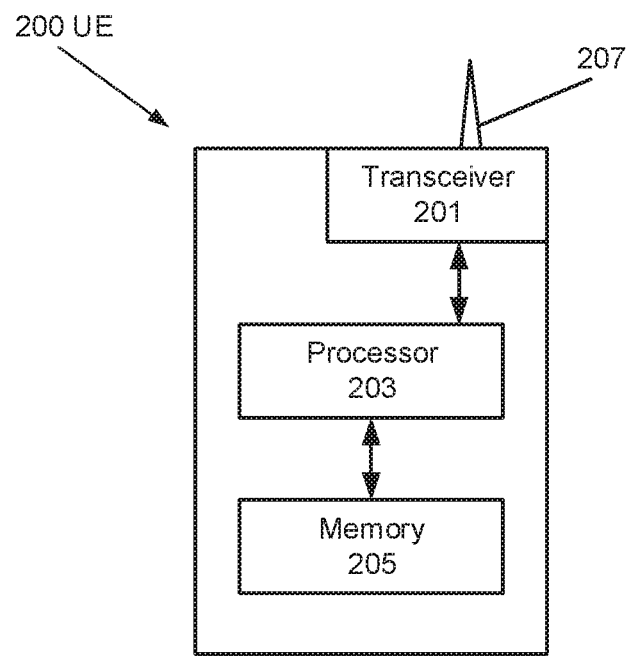
FIG. 2 is a diagram illustrating a wireless device according to some embodiments.

Although wireless devices 105 may represent communication devices that include any suitable combination of hardware and/or software, these wireless devices may, in certain embodiments, represent devices such as an example wireless device illustrated in greater detail by FIG. 2. Similarly, although the illustrated radio access node may represent network nodes that include any suitable combination of hardware and/or software, these nodes may, in particular embodiments, represent devices such as the example radio access node illustrated in greater detail by FIGS. 3A and 3B.

Reference is now made to FIG. 2, which is a diagram illustrating a wireless device according to some embodiments. The wireless device, which may be referred to herein as a UE 200 (also referred to as a wireless terminal, a wireless communication device, a wireless communication terminal, user equipment, a user equipment node/terminal/device, etc.) may be configured to provide operations according to embodiments of inventive concepts. As shown, the UE 200 may include an antenna 207, and a transceiver circuit 201 (also referred to as a transceiver) including a transmitter and a receiver that are configured to provide uplink and downlink radio communications with a base station of a radio access network, and to provide communications with other wireless communication devices. The UE 200 may also include a processor circuit 203 (also referred to as a processor) coupled to the transceiver circuit 201, and a memory circuit 205 (also referred to as memory) coupled to the processor circuit 203. The memory circuit 205 may include computer readable program code that when executed by the processor circuit 203 causes the processor circuit 203 to perform operations according to embodiments disclosed herein for a UE 200. According to other embodiments, processor circuit 203 may be defined to include memory so that a separate memory circuit is not required. The UE 200 may also include an interface (such as a user interface) coupled with processor 203, and/or the UE 200 may be incorporated in a vehicle.

As discussed herein, operations of the UE 200 may be performed by processor 203 and/or transceiver 201. For example, processor 203 may control transceiver 201 to transmit communications through transceiver 201 over a radio interface to another node and/or to receive communications through transceiver 201 from another node over a radio interface. Moreover, modules may be stored in memory 205, and these modules may provide instructions so that when instructions of a module are executed by processor 203, processor 203 performs respective operations (e.g., operations discussed below with respect to example embodiments).

In certain embodiments, some or all of the functionality described as being provided by UEs, MTC or M2M devices, and/or any other types of wireless communication devices may be provided by the device processor executing instructions stored on a computer-readable medium, such as the memory shown in FIG. 2. Some embodiments include additional components beyond those shown in FIG. 2 that may be responsible for providing certain aspects of the device's functionality, including any of the functionality described herein.

Figure 3A:
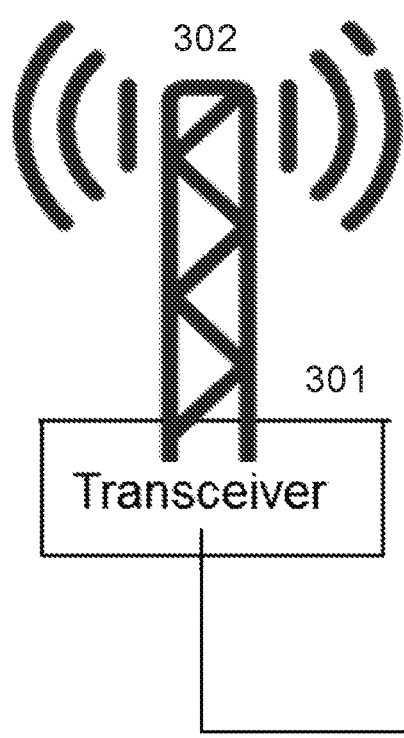
FIG. 3A is a block diagram illustrating elements of a base station of a Radio Access Network (RAN) configured to provide cellular communication according to embodiments of inventive concepts.
Figure 3A:
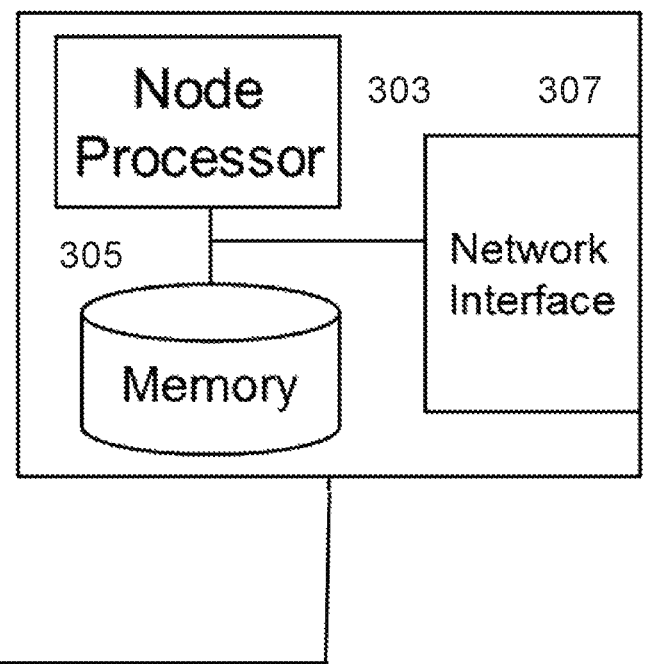

Reference is now made to FIG. 3A, which is a block diagram illustrating elements of a base station 300 (also referred to as a node, base station, eNB, eNodeB, etc.) of a Radio Access Network (RAN) configured to provide cellular communication according to embodiments of inventive concepts. As shown, the base station 300 may include a transceiver circuit 301 (also referred to as a transceiver) including a transmitter and a receiver configured to provide uplink and downlink radio communications with UEs via an antenna 302. The base station 300 may include a network interface circuit 307 (also referred to as a network interface) configured to provide communications with other nodes (e.g., with other base stations) of the RAN. The base station 300 may also include a processor circuit 303 (also referred to as a processor) coupled to the transceiver circuit, and a memory circuit 305 (also referred to as memory) coupled to the processor circuit. The memory circuit 305 may include computer readable program code that when executed by the processor circuit 303 causes the processor circuit to perform operations according to embodiments disclosed herein. According to other embodiments, processor circuit 303 may be defined to include memory so that a separate memory circuit is not required.

As discussed herein, operations of the base station 300 may be performed by processor 303, network interface 307, and/or transceiver 301. For example, processor 303 may control transceiver 301 to transmit communications through transceiver 301 over a radio interface to one or more UEs and/or to receive communications through transceiver 301 from one or more UEs over a radio interface. Similarly, processor 303 may control network interface 307 to transmit communications through network interface 307 to one or more other network nodes and/or to receive communications through network interface from one or more other network nodes. Moreover, modules may be stored in memory 305, and these modules may provide instructions so that when instructions of a module are executed by processor 303, processor 303 performs respective operations (e.g., operations discussed below with respect to example embodiments of network nodes).

Figure 3B:
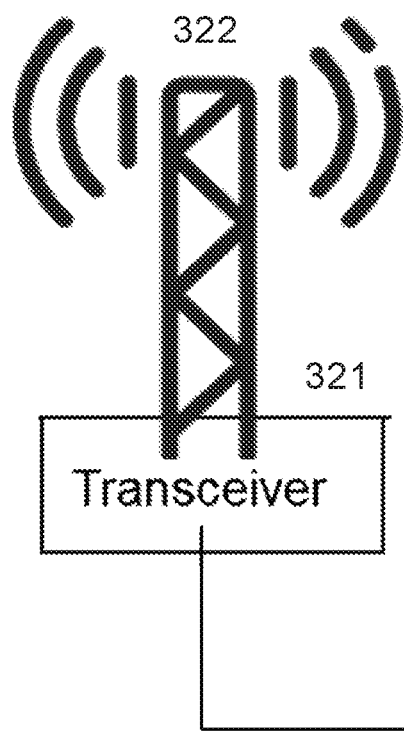
FIG. 3B is a block diagram illustrating elements of a core network node of a Radio Access Network (RAN) configured to enable cellular communication according to embodiments of inventive concepts.
Figure 3B:
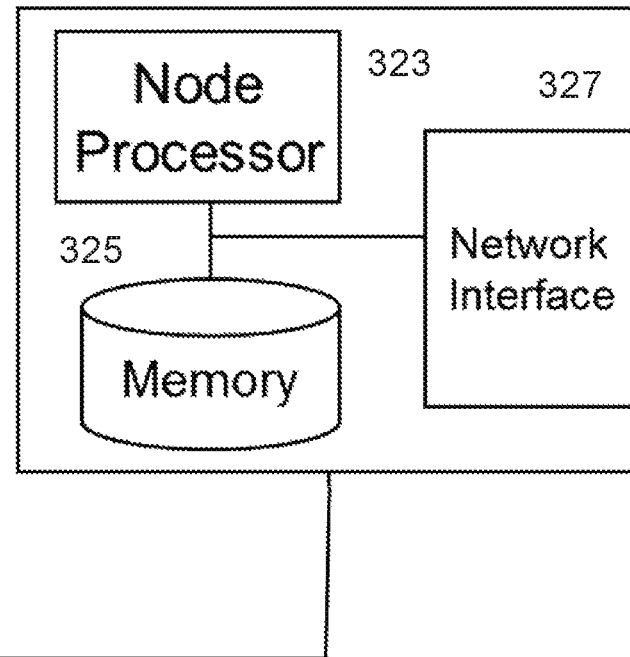

Reference is now made to FIG. 3B, which is a block diagram illustrating elements of a core network node 320 (also referred to as a node) of a Radio Access Network (RAN) configured to enable cellular communication according to embodiments of inventive concepts. As shown, the core network node 320 may include a transceiver circuit 321 (also referred to as a transceiver) including a transmitter and a receiver configured to provide uplink and downlink radio communications with UEs via antenna 322. The core network node 320 may include a network interface circuit 327

(also referred to as a network interface) configured to provide communications with other nodes (e.g., with other base stations) of the RAN. The network node may also include a processor circuit 323 (also referred to as a processor) coupled to the transceiver circuit, and a memory circuit 325 (also referred to as memory) coupled to the processor circuit. The memory circuit 325 may include computer readable program code that when executed by the processor circuit 323 causes the processor circuit 323 to perform operations according to embodiments disclosed herein. According to other embodiments, processor circuit 323 may be defined to include memory so that a separate memory circuit is not required.

As discussed herein, operations of the core network node 320 may be performed by processor 323, network interface 327, and/or transceiver 321. For example, processor 323 may control transceiver 321 to transmit communications through transceiver 321 over a radio interface to one or more UEs and/or to receive communications through transceiver 321 from one or more UEs over a radio interface. Similarly, processor 323 may control network interface 407 to transmit communications through network interface 327 to one or more other network nodes and/or to receive communications through network interface from one or more other network nodes. Moreover, modules may be stored in memory 325, and these modules may provide instructions so that when instructions of a module are executed by processor 323, processor 323 performs respective operations (e.g., operations discussed below with respect to example embodiments of network nodes).

Figure 4:
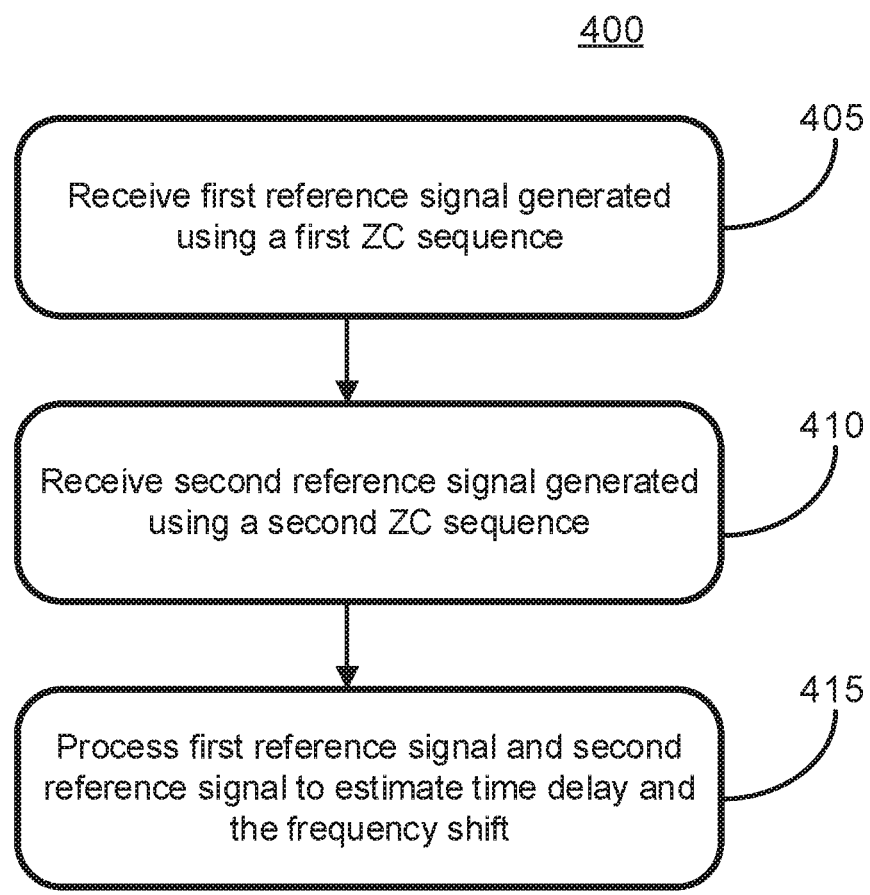
FIG. 4 is a flowchart illustrating a method of operating a radio node according to some embodiments.

Reference is now made to FIG. 4, which is a flowchart illustrating a method 400 of operating a radio node (e.g., a wireless device 105 or a radio access node 110). The method 400 includes receiving a first reference signal that is generated using a first ZC sequence (block 405). The method 400 includes receiving a second reference signal that is generated using a second ZC sequence (block 410).

In some embodiments, the first and second reference signals are downlink synchronization signals in a radio access network. Some embodiments provide that the first and second reference signals are uplink random access preambles in a radio access network. Some embodiments provide that the radio access network is an LTE or a 5G network, however, such embodiments are non-limiting examples as the first and second reference signal generated from first and second ZC sequences may be used in other contexts and/or types of radio access networks.

Figure 12:
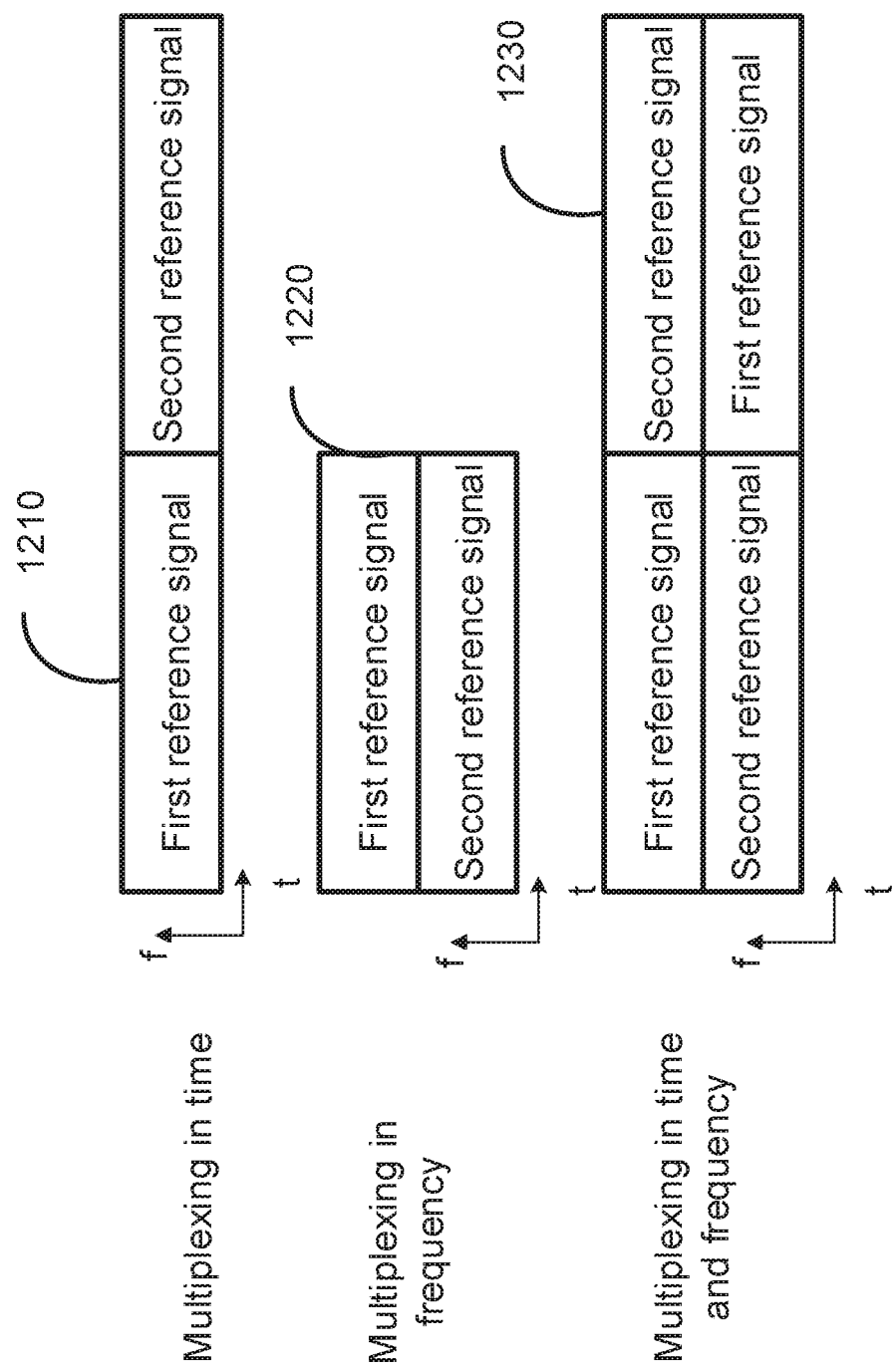
FIG. 12 is an illustration of different ways of multiplexing reference signals transmitted to a radio node according to some embodiments.

Some embodiments provide that the first and second reference signals may be multiplexed. For example, brief reference is now made to FIG. 12, which is an illustration of different ways of multiplexing reference signals transmitted to a radio node according to some embodiments. Some embodiments provide that the first and second reference signals generated from the first and second ZC sequences may be time domain multiplexed 1210. In some embodiments, the first and second reference signals generated from the first and second ZC sequences may be frequency domain multiplexed 1220. In some embodiments, the first and second reference signals generated from the first and second ZC sequences may be time domain and frequency domain multiplexed 1230.

Although not illustrated, the first and second reference signals can be further repeated multiple times in the time domain, the frequency domain, and/or a combination of the time and frequency domains.

The choice of multiplexing technique may depend on the constraints and/or design targets of the radio access network. For example, in embodiments in which minimizing the bandwidth of the reference signals in the radio access network is a priority, multiplexing the first and second reference signals generated from the two ZC sequences in the time domain may be used. However, multiplexing in the time domain may be more sensitive to Doppler and channel variation. In embodiments in which robustness with respect to Doppler and channel variation is a priority (i.e., to support high mobility scenarios), multiplexing the first and second reference signals generated from the two ZC sequences the frequency domain may be used.

Referring back to FIG. 4, the differences between the first and second reference signals may be based on differences between the first and second ZC sequences. For example, the first ZC sequence may be generated using a first root and the second ZC sequence may be generated using a second root that is different than the first root. Some embodiments provide that the first and second ZC sequences may be the same length, while other embodiments may provide that the first and second ZC sequences may be different lengths relative to one another. In some embodiments, the second ZC sequence may have a cyclic shift relative to the first ZC sequence. Some embodiments provide that the second ZC sequence is generated as a conjugate of the first ZC sequence. In such embodiments, the first ZC sequence and the second ZC sequence may have the same root, the same length and/or the same cyclic shift.

The method 400 may include processing the received first and second reference signals that are generated using the first and second ZC sequences to estimate the time delay and/or the frequency shift of at least one of the first and second reference signals.

Figure 5:
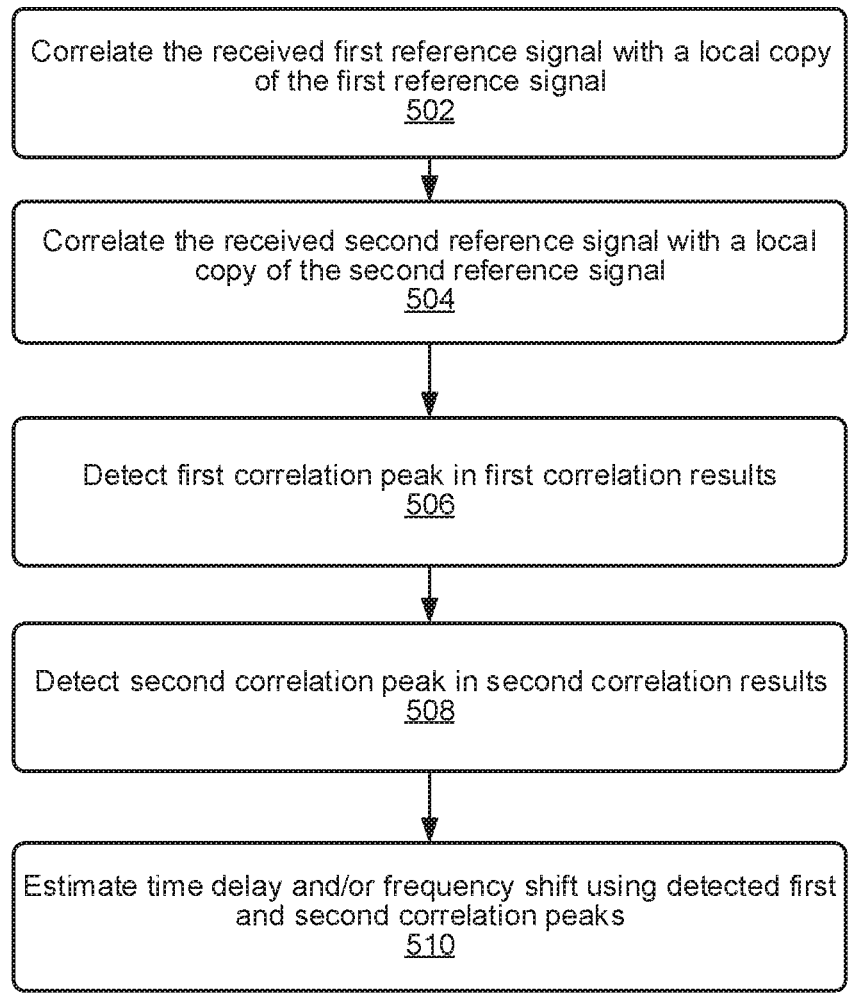
FIG. 5 is a flowchart illustrating operations for processing the received first and second reference signals as provided in FIG. 4 according to some embodiments.

Reference is now made to FIG. 5, which is a flowchart illustrating operations for processing the received first and second reference signals as provided in FIG. 4 according to some embodiments. Processing the first and second reference signals may include correlating the received first reference signal with a local copy of the first reference signal to generate a first set of correlation results (block 502). The received second reference signal may be correlated with a local copy of the second reference signal to generate a second set of correlation results (block 504). A first correlation peak in the first set of correlation results may be detected (block 506) and a second correlation peak in the second set of correlation results may be detected (block 508). The time delay and/or frequency shift may be estimated using the detected first and second correlation peaks (block 510).

The timing and frequency offset ambiguities of ZC sequences may be understood by examining their theoretical properties. To this end, the following notation may be used:

$N_{ZC}$: the length of a ZC sequence u: the root of a ZC sequence, and $0<u<N_{ZC}$ p: the inverse modulo $N_{ZC}$ of u, i.e., (p*u) mod $N_{ZC}=1$, and $0<p<N_{ZC}$ $f_{SC}$: the subcarrier spacing of an OFDM signal $\Delta f$: the frequency offset between transmit and receive signals $n_0$: the delay of receive signals relative to the transmit signal A general expression for ZC sequences may be:

$$x_u[n] = \exp\left(-\frac{j\pi u n(n+1)}{N_{ZC}}\right), n = 0, 1, \ldots, N_{ZC}-1.$$

Assuming that $N_{ZC}$ is prime, each u may be associated with a unique inverse modulo $N_{ZC}$. It can be shown that if $k=\Delta f/f_{SC}$ (and for simplicity k is assumed to be an integer), then the peak of correlation of the transmit and receive signals may be located at the position of $(n_0+kp) \bmod N_{ZC}$. Since both delay and frequency shift cause cyclic shift in the received ZC sequences, a composite cyclic shift may be generated from which the effect of delay cannot be separated from the effect of frequency shift.

In some embodiments, by using two reference signals generated from two different ZC sequences, two equations may be available to solve for the two unknown values, namely, delay and frequency offset. For example, if a transmitter sends two reference signals based on two ZC sequences that have different properties, the receiver can resolve the timing and frequency offset ambiguities by processing the two received reference signals. As discussed above, the two ZC sequences having the same length and have different roots $u_1$ and $u_2$ respectively (and $u_1 \neq u_2$) are transmitted. The correlation peaks of the transmit and receive signals may be located at the following two positions:

Position 1: of $(n_0+kp_1) \bmod N_{ZC}$
Position 2: of $(n_0+kp_2) \bmod N_{ZC}$ where $p_1$ and $p_2$ are the inverse modulo $N_{ZC}$ of $u_1$ and $u_2$ respectively.

In some embodiments, the two ZC sequences with the same roots u and a relative cyclic shift of m such that m mod $N_{ZC} \neq 0$, may be transmitted. The correlation peaks of such transmit and receive signals may be located at the following two positions:

Position 1: of $(n_0+kp_1) \bmod N_{ZC}$
Position 2: of $(n_0+m+kp_2) \bmod N_{ZC}$ In yet further embodiments, the two ZC sequences may be of the same length and of the same root and same cyclic shift, but a conjugate operation is applied to one of the two sequences. For example, for two ZC sequences with roots u and $-u$ respectively, the peak of correlation of the transmit and receive signals may be located at the following two positions:

Position 1: of $(n_0+kp) \bmod N_{ZC}$
Position 2: of $(n_0-kp) \bmod N_{ZC}$

In such embodiments, the second ZC sequence can be treated as the conjugate copy of the first ZC sequence. Such embodiments may be treated as a special case of the embodiment where the ZC sequences have the same length but different roots.

In the foregoing embodiments, the two ZC sequences may be of the same length. However, some embodiments provide that the two ZC sequences may be of different lengths. Additionally, as discussed above, the two roots may be either different or the same, the two cyclic shifts may be either different or the same, and/or a conjugate operation may be either applied or not applied.

Figure 10:
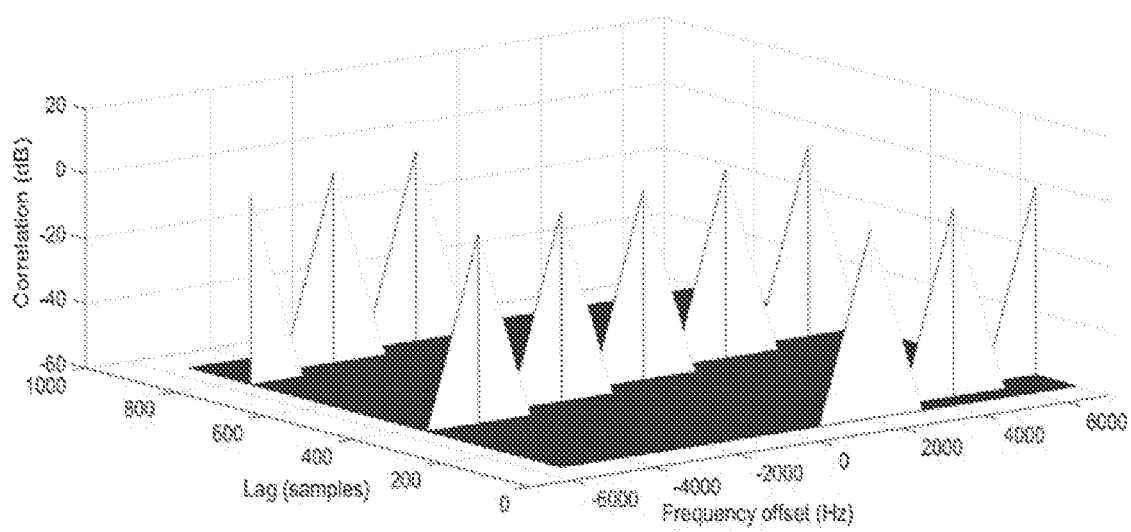
FIG. 10 is a second graph of correlation results of a conventional correlation operation performed by a radio node on a received reference signal and a local copy of the reference signal.
Figure 11:
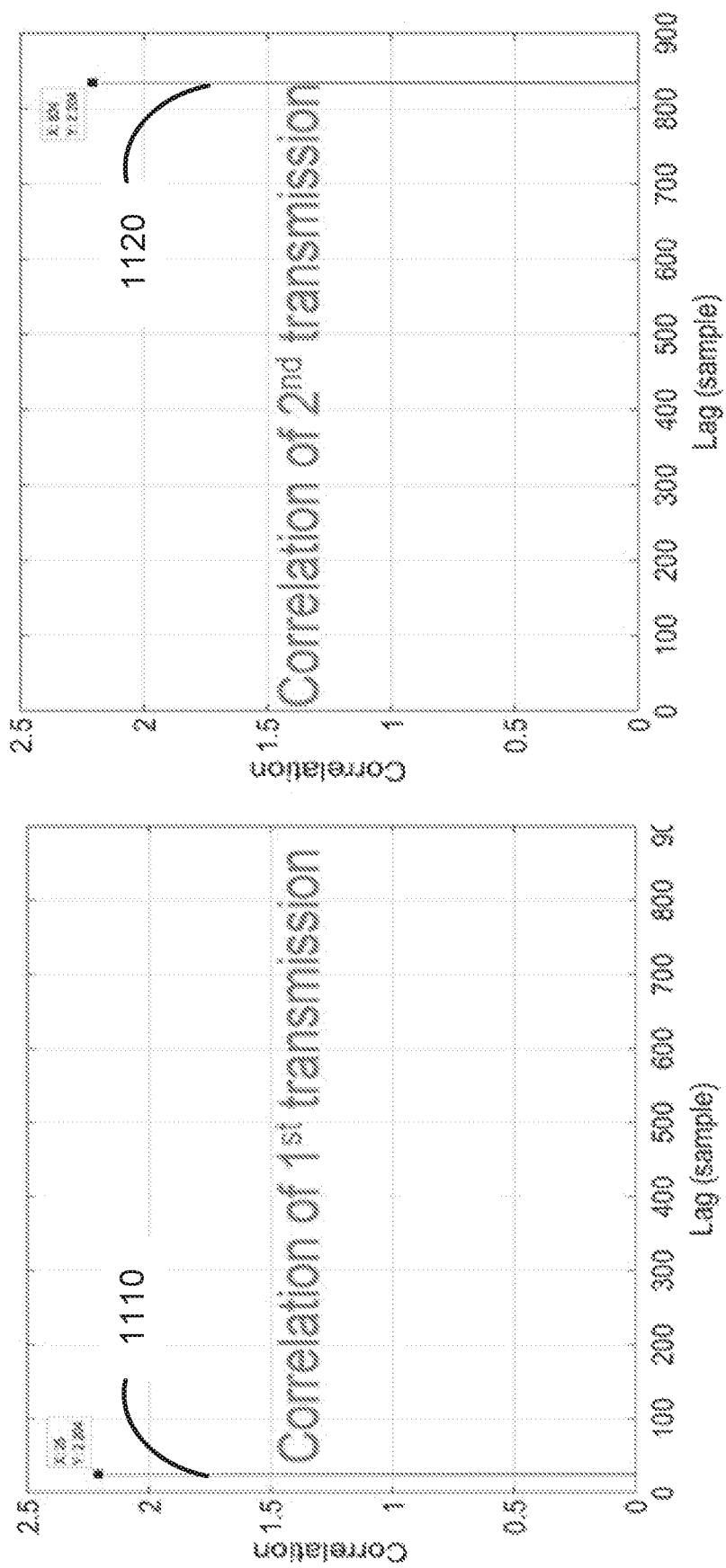
FIG. 11 is a graph of correlation results of a correlation operation performed by a radio node on two received reference signals and corresponding local copies of the reference signals according to some embodiments.

Taking the LTE PRACH as an example, assume a 10-sample delay and a 1.25 kHz frequency offset between transmitter and receiver. The receiver may be configured to estimate delay and frequency offset by correlating the received first and second reference signals that are generated using first and second ZC sequences with its reference copies of the transmitted signals. Reference is now made to FIG. 10, which is a graph of correlation results of a correlation operation performed by a radio node on two received reference signals that are generated using first and second ZC sequences and corresponding local copies of the reference signals according to some embodiments.

As illustrated, the correlation of the first transmission corresponding to the received first reference signal and the reference copy of the first ZC sequence provides a first peak of correlation 1110 of the transmit and receive signals that is located at the $25^{th}$ lag (sample). Additionally, the correlation of the second transmission corresponding to the received second reference signal and the reference copy of the second ZC sequence provides a first peak of correlation 1120 of the transmit and receive signals that is located at the $834^{th}$ lag (sample).

The difference between the two correlation peaks may be used to estimate the time delay as ((25 (first peak)+834 (second peak)) mod 839 (length of ZC sequence))/2=10, since 839 is the length of a ZC sequence in an LTE PRACH. After estimating the delay, a frequency estimate can be further performed if needed. This example illustrates that transmitting reference signals based on two ZC sequences allows a receiver to separate the effects of time delay and frequency offset in an LTE PRACH.

The foregoing embodiments are described with reference to an LTE PRACH but may also be applicable to the design of a 5G NR synchronization channel. The subcarrier spacing may be chosen as 60 kHz, which is four times larger than the existing LTE subcarrier spacing of 15 kHz. Like LTE, the PSS in 5G NR can be one or more of length-63 ZC sequences. They may be extended with five zeros at the edges and mapped to the center 73 subcarriers as in LTE. Unlike LTE where only one PSS based on one ZC sequence is sent in each cell, a 5G NR PSS may be constructed from two ZC sequences, according to one or more embodiments described above.

At the transmitter side, the wireless equipment (e.g., radio access node or wireless device) may generate the reference signals (e.g., a modified LTE PRACH or a potential 5G NR synchronization signal) by using two ZC sequences, according to one or more embodiments described above.

At the receiver side, the wireless equipment (e.g., base station or UE) receives the reference signals (e.g., the modified LTE PRACH or the potential 5G NR synchronization signal) that are constructed from two ZC sequences, according to one or more embodiments described above. After receiving the reference signals, the wireless equipment processes the signals to estimate delay and/or frequency offset. To this end, the receiver may exploit the properties of the two ZC sequences. Specifically, as described above, the receiver side can observe two peaks by correlating the received signals with a local copy of the reference signals. Based on the positions of the two peaks, the receiver side can detect the signals and estimate delay and/or frequency offset.

As another example of how to exploit the properties of the two ZC sequences at the receiver, the receiver may use different hypotheses of time and frequency offset to obtain a single correlation peak, and then detect the signals and estimate delay and/or frequency offset based on the best hypothesis.

Figure 6:
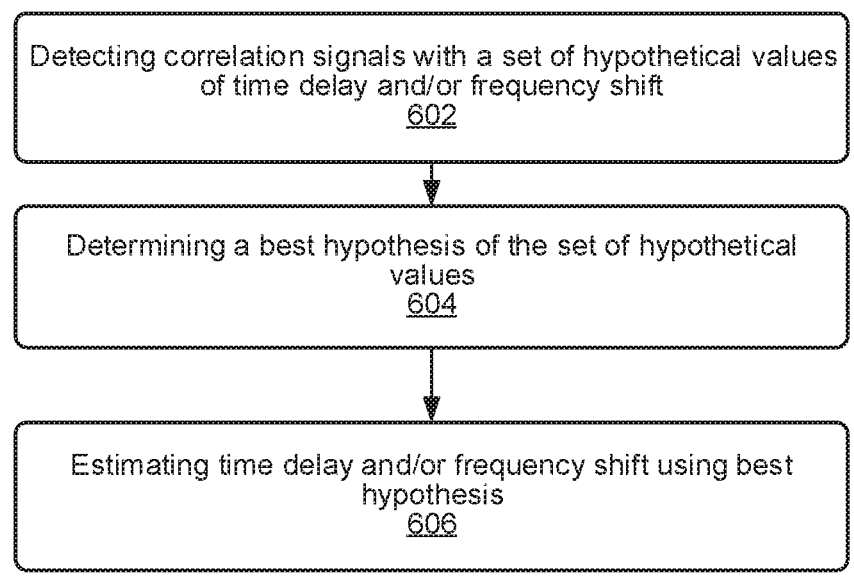
FIG. 6 is a flowchart illustrating operations for processing the received first and second reference signals as provided in FIG. 4 according to some embodiments.

Reference is now made to FIG. 6, which is a flowchart illustrating operations for processing the received first and second reference signals as provided in FIG. 4 according to some embodiments. Operations may include detecting the signals using a set of hypotheses of at least one of the time delay and frequency shift (block 602). A best hypothesis of the set of hypotheses may be determined (block 604). At least one of the time delay and the frequency shift may be estimated using the best hypothesis (block 606).

Figure 7:
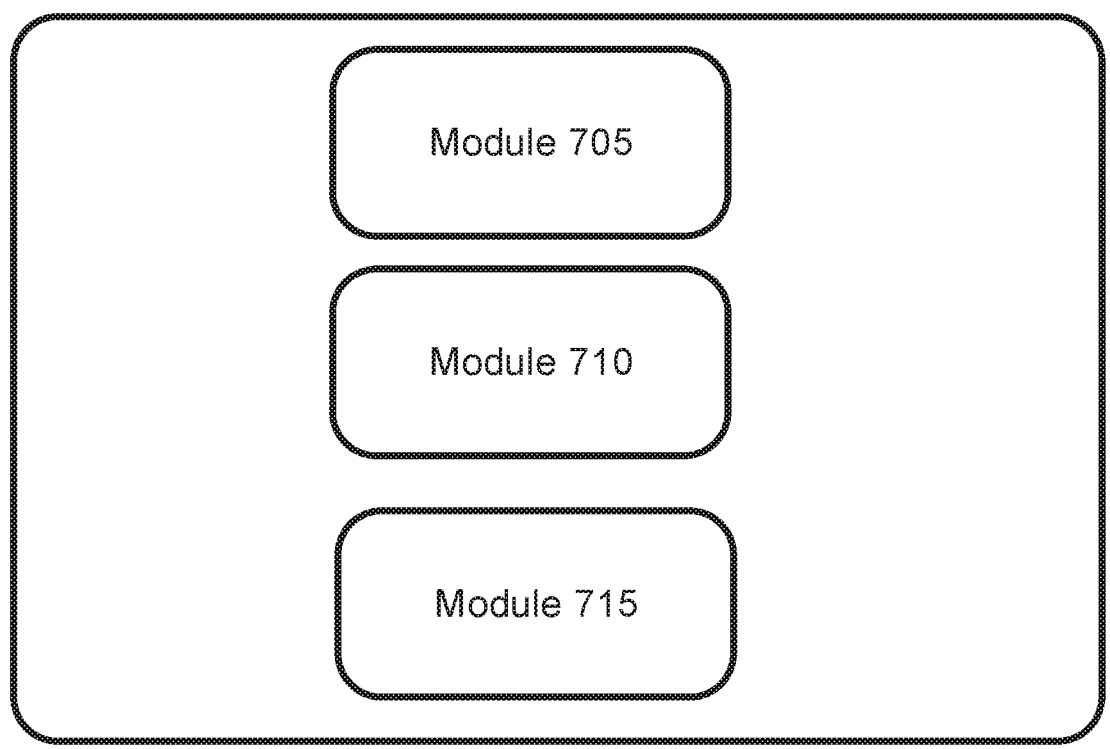
FIG. 7 is a functional block diagram of a radio node according to some embodiments.
Figure 8:
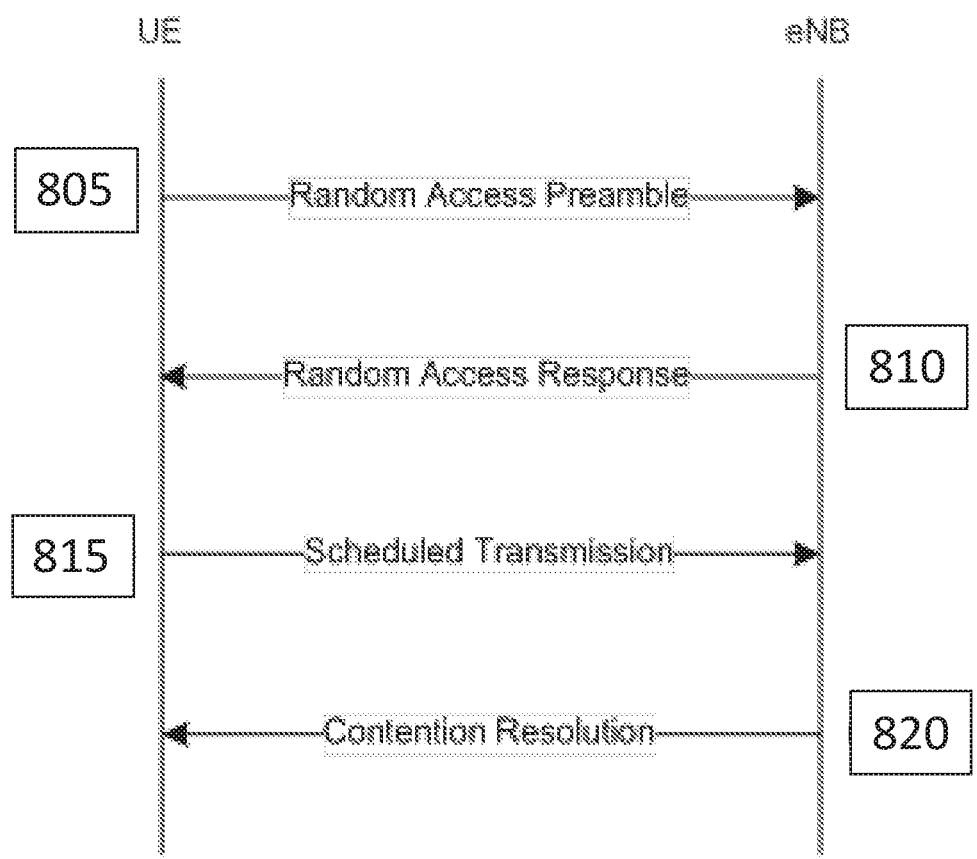
FIG. 8 is a signal flow diagram illustrating a contention-based random-access procedure.

Brief reference is now made to FIG. 7, which is a functional block diagram of a radio node 700 (e.g., a wireless device 105 or a radio access node 110). The radio node 700 includes a module 705, which is adapted to carry out the of operations 405 of method 400, a module 710, which is adapted to carry out the operations 410 of method 400, and a module 715, which is adapted to carry out the operations 415 of method 400.

Figure 13:
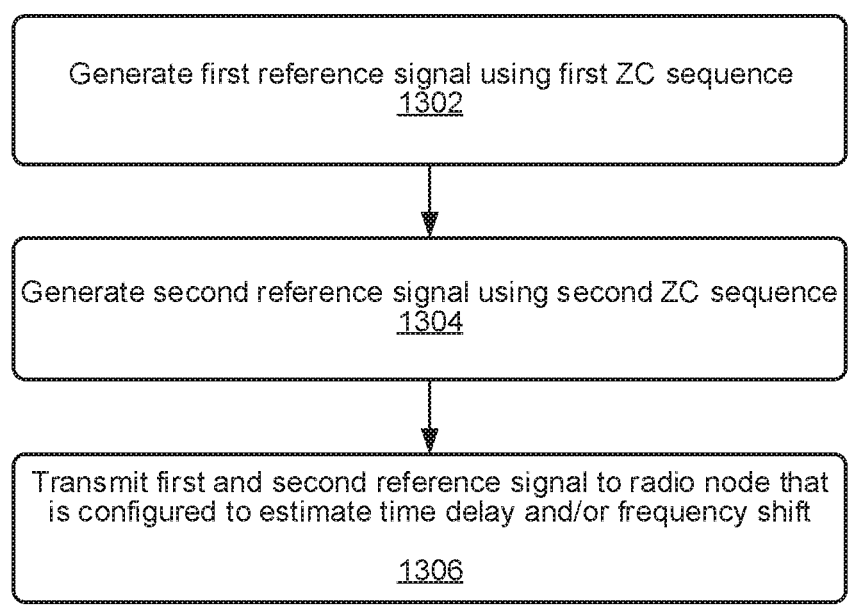
FIG. 13 is a flowchart illustrating operations according to some embodiments.

Reference is now made to FIG. 13, which is a flowchart illustrating operations according to some embodiments. Operations include generating a first reference signal using a first ZC sequence (block 1302). A second reference signal may be generated using a second ZC sequence (block 1304). The first and second reference signals are transmitted to a radio node that is configured to estimate the time delay and/or frequency shift using the first and second reference signals (block 1306).

Figure 14:
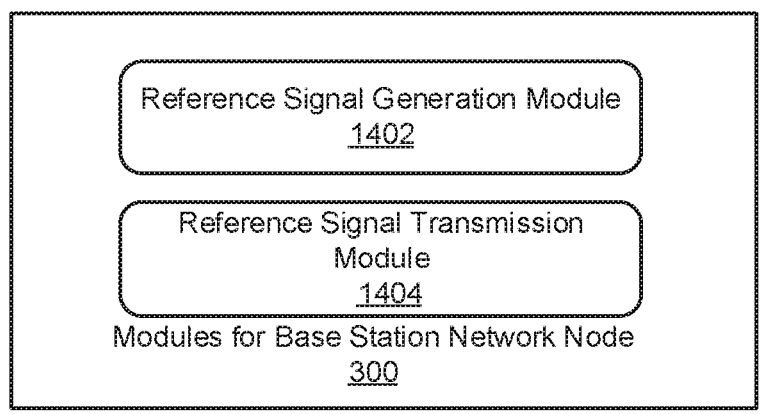
FIG. 14 illustrates modules for an eNodeB network node that perform operations as disclosed herein according to some embodiments.

Reference is now made to FIG. 14, which illustrates modules for a base station network node that perform operations as disclosed herein according to some embodiments. As shown therein, a base station network node 300 may include a reference signal generation module 1402 and a reference signal transmission module 1404. The reference signal generation module 1402 may be configured to generate first and second reference signals using first and second ZC sequences. The reference signal transmission module 1404 may be configured to transmit the first and second reference signals to a radio node that is configured to estimate the time delay and/or frequency shift using the first and second reference signals.

Figure 15:
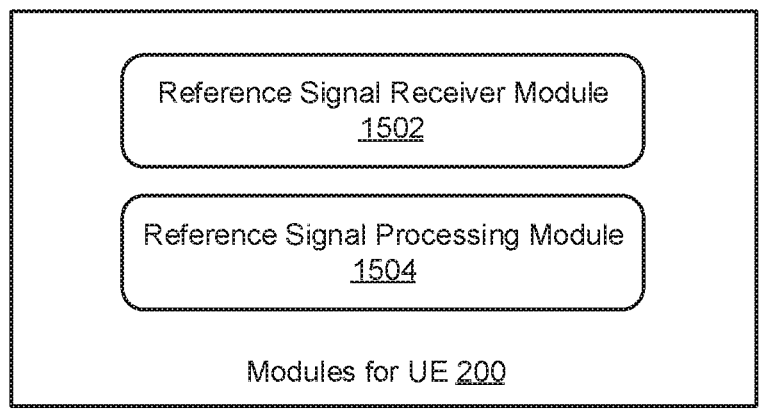
FIG. 15 illustrates modules for a UE that perform operations as disclosed herein according to some embodiments.

Reference is now made to FIG. 15, which illustrates modules for a UE that perform operations as disclosed herein according to some embodiments. As shown therein, a UE 200 may include a reference signal receiver module 1502 and a reference signal processing module 1504. The reference signal receiver module 1502 is configured to receive a first reference signal that is generated using a first Zadoff-Chu (ZC) sequence and a second reference signal that is generated using a second ZC sequence. The reference signal processing module 1504 is configured to process the first reference signal and the second reference signal to estimate at least one of the time delay and the frequency shift of the first reference signal and/or the second reference signal.

Figure 16:
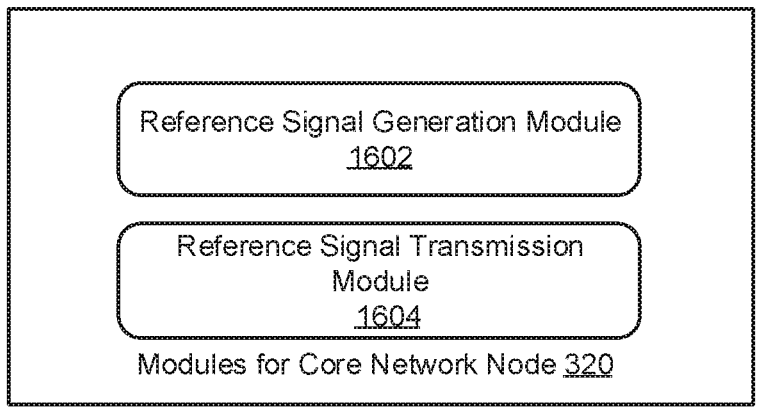
FIG. 16 illustrates modules for a core network node that perform operations as disclosed herein according to some embodiments.

Reference is now made to FIG. 16, which illustrates modules for a core network node that perform operations as disclosed herein according to some embodiments. As shown therein, a core network node 320 may include a reference signal generation module 1602 and a reference signal transmission module 1604. The reference signal generation module 1602 may be configured to generate first and second reference signals using first and second ZC sequences. The reference signal transmission module 1604 may be configured to transmit the first and second reference signals to a radio node that is configured to estimate the time delay and/or frequency shift using the first and second reference signals.

The above description corresponding to FIGS. 14-16 may generally be directed to operations herein being used in a downlink transmission, however, the operations herein are not so limited. For example, some embodiments are directed to using the operations described herein in an uplink transmission. In such embodiments, the reference signal receiver module 1502 and the reference signal processing module 1504 may be in the base station network node 300 and/or the core network node 320 and the reference signal generation module 1402, 1602 and the reference signal transmission module 1404, 1604 may be in the UE 200.

While the disclosed subject matter has been presented above with reference to various embodiments, it will be understood that various changes in form and details may be made to the described embodiments without departing from the overall scope of the disclosed subject matter.

LIST OF ABBREVIATIONS

CP Cyclic Prefix
eNB Enhanced Node B
LEO Low Earth Orbit
LTE Long Term Evolution
NR New Radio
OFDMA Orthogonal Frequency-Division Multiple Access
PRACH Physical Random Access Channel
PSS Primary Synchronization Signal
SC-FDMA Single-carrier Frequency-division Multiple Access
SSS Secondary Synchronization Signal
ToA Time of Arrival
UE User Equipment
ZC Zadoff-Chu In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random-access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

What is claimed is:

1. A method of estimating a time delay and/or a frequency shift of a reference signal, the method comprising:
receiving a first reference signal that is generated using a first Zadoff-Chu (ZC) sequence;
receiving a second reference signal that is generated using a second ZC sequence that is different than the first ZC sequence; and
processing the first reference signal and the second reference signal to estimate at least one of the time delay and the frequency shift of the first reference signal and/or the second reference signal, wherein processing the received first and second reference signals includes:
correlating the received first reference signal with a local copy of the first reference signal to generate a first set of correlation results;
correlating the received second reference signal with a local copy of the second reference signal to generate a second set of correlation results;
detecting a first correlation peak in the first set of correlation results;
detecting a second correlation peak in the second set of correlation results; and
estimating at least one of the time delay and the frequency shift of at least one of the reference signals using the detected first and second correlation peaks.

2. The method of claim 1, wherein processing the received first and second reference signals includes:
   detecting the signals using a set of hypotheses of at least one of the time delay and frequency shift;
   determining a best hypothesis of the set of hypotheses; and
   estimating at least one of the time delay and frequency shift according to the best hypothesis.

3. The method of claim 1, wherein the received first and second reference signals are time and/or frequency domain multiplexed.

4. The method of claim 1,
   wherein the first ZC sequence is generated using a first root and the second ZC sequence is generated using a second root that is different than the first root, and
   wherein the first ZC sequence has a same length as the second ZC sequence.

5. The method of claim 1,
   wherein the second ZC sequence includes a cyclic shift relative to the first ZC sequence; or
   wherein the second ZC sequence is generated as a conjugate of the first ZC sequence.

6. The method of claim 1, wherein the first ZC sequence and the second ZC sequence comprise a same root, a same length and a same cyclic shift.

7. The method of claim 1,
   wherein the first ZC sequence comprises a first length and the second ZC sequence comprises a second length that is different than the first length.

8. The method of claim 1, wherein the first and second reference signals are downlink synchronization signals in a radio access network.

9. A radio communication network comprising:
   a first radio node that comprises:
      a transceiver to provide wireless communication over a radio interface;
      at least one processor coupled to the transceiver; and
      at least one memory coupled to the at least one processor and storing program code that when executed by the at least one processor causes the at least one processor to perform operations comprising:
         receiving, via the transceiver, a first reference signal that is generated using a first Zadoff-Chu (ZC) sequence,
         receiving, via the transceiver, a second reference signal that is generated using a second ZC sequence that is different than the first ZC sequence, and
         processing the first reference signal and the second reference signal to estimate at least one of the time delay and the frequency shift of the first reference signal and/or the second reference signal; and
   a second radio node that is configured to generate the first and second signals and to transmit the first and second reference signals to the first radio node.

10. The radio communication network of claim 9, wherein at least one of the first radio node and the second radio node comprises one of: a satellite and an airborne device.

11. A wireless communication device (UE) comprising:
    a transceiver to provide wireless communication over a radio interface;
    at least one processor coupled to the transceiver; and
    at least one memory coupled to the at least one processor and storing program code that when executed by the at least one processor causes the at least one processor to perform operations comprising:
       receiving a first reference signal that is generated using a first Zadoff-Chu (ZC) sequence;
       receiving a second reference signal that is generated using a second ZC sequence that is different than the first ZC sequence; and
       processing the first reference signal and the second reference signal to estimate at least one of the time delay and the frequency shift of the first reference signal and/or the second reference signal.

12. The wireless communication device of claim 11, wherein processing the received first and second reference signals comprises:
    correlating the received first reference signal with a local copy of the first reference signal to generate a first set of correlation results;
    correlating the received second reference signal with a local copy of the second reference signal to generate a second set of correlation results;
    detecting a first correlation peak in the first set of correlation results;
    detecting a second correlation peak in the second set of correlation results; and
    estimating at least one of the time delay and the frequency shift of at least one of the reference signals using the detected first and second correlation peaks.

13. The wireless communication device of claim 11, wherein processing the received first and second reference signals comprises:
    generating correlation peaks corresponding to a set of hypothetical values of time delay and/or frequency shift;
    detecting the first and second reference signals using the set of hypothetical values;
    determining a best hypothesis of the set of hypothetical values; and
    estimating at least one of the time delay and frequency shift according to the best hypothesis.

14. A method of estimating a time delay and/or a frequency shift of a reference signal, the method comprising:
    generating a first reference signal using a first Zadoff-Chu (ZC) sequence;
    generating a second reference signal using a second ZC sequence that is different than the first ZC sequence;
    multiplexing the first and second reference signals before transmitting the first and second reference signals; and
    transmitting the multiplexed first and second reference signals to a radio node that is configured to process the first reference signal and the second reference signal to estimate at least one of the time delay and the frequency shift of the first reference signal and/or the second reference signal.

15. The method of claim 14, wherein the first and second reference signals are time domain multiplexed and/or frequency domain multiplexed.

16. The method of claim 14,
    wherein the first ZC sequence is generated using a first root and the second ZC sequence is generated using a second root that is different than the first root, and
    wherein the first ZC sequence has a same length as the second ZC sequence.

17. The method of claim 14, wherein the second ZC sequence is generated as a conjugate of the first ZC sequence.

18. The method of claim 17, wherein the first ZC sequence and the second ZC sequence comprise a same root, a same length and a same cyclic shift.

19. The method of claim 14,
wherein the first ZC sequence comprises a first length and the second ZC sequence comprises a second length that is different than the first length.

20. The method of claim 14, wherein the first and second reference signals are downlink synchronization signals in a radio access network or are uplink random access preambles in the radio access network.

\* \* \* \* \*